No. 730,652. PATENTED JUNE 9, 1903.
O. HOLZ.
PHASE INDICATOR.
APPLICATION FILED OCT. 27, 1902.
NO MODEL. 2 SHEETS—SHEET 1.

Witnesses:
George A. Thornton
Helen Orford

Inventor:
Otto Holz,
by Albert G. Davis
Att'y

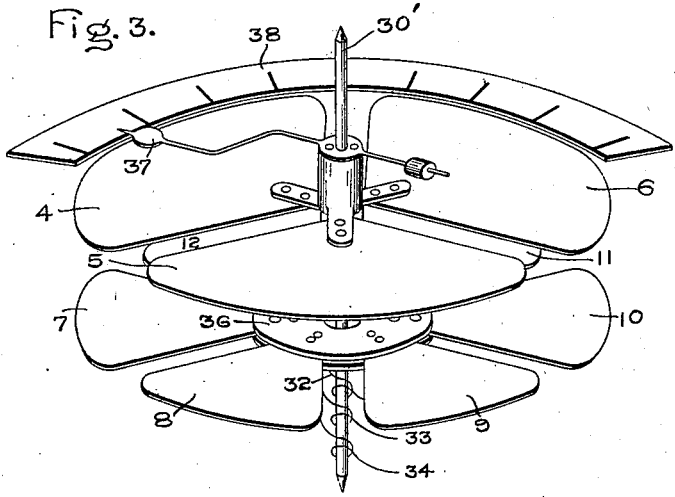

No. 730,652. Patented June 9, 1903.

UNITED STATES PATENT OFFICE.

OTTO HOLZ, OF SCHENECTADY, NEW YORK, ASSIGNOR TO GENERAL ELECTRIC COMPANY, A CORPORATION OF NEW YORK.

PHASE-INDICATOR.

SPECIFICATION forming part of Letters Patent No. 730,652, dated June 9, 1903.

Application filed October 27, 1902. Serial No. 128,886. (No model.)

*To all whom it may concern:*

Be it known that I, OTTO HOLZ, a citizen of the United States, residing at Schenectady, county of Schenectady, State of New York, have invented certain new and useful Improvements in Phase-Indicators, of which the following is a specification.

My present invention relates to the measurement of phase differences of alternating currents, and more particularly to the measurement of power factor of an alternating current, and is embodied in an instrument so organized as to be responsive to electrostatic action. The instrument comprises two relatively rotatable members, one of which is charged electrostatically in accordance with the voltage of an alternating-current system and the other in accordance with the current flowing in said system. The two members are free to move relatively to each other and to assume various relative positions depending upon the phase relations between the current and electromotive force of the system, or, in other words, upon the power factor.

The features of novelty which characterize my invention I have pointed out with particularity in the appended claims, while the invention itself, both as to its details of construction and mode of operation, is set forth more at length in the following description, which is to be taken in connection with the accompanying drawings, in which—

Figure 1:
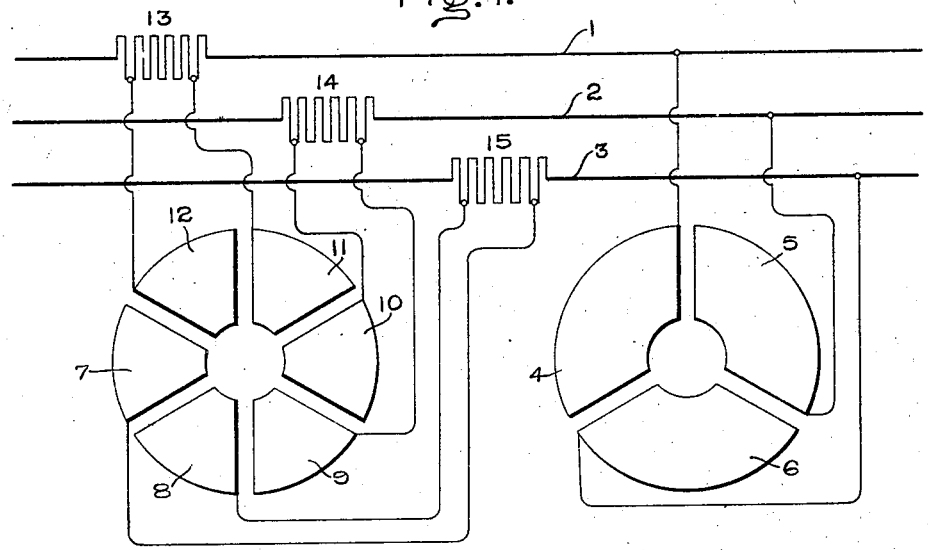
Figure 2:
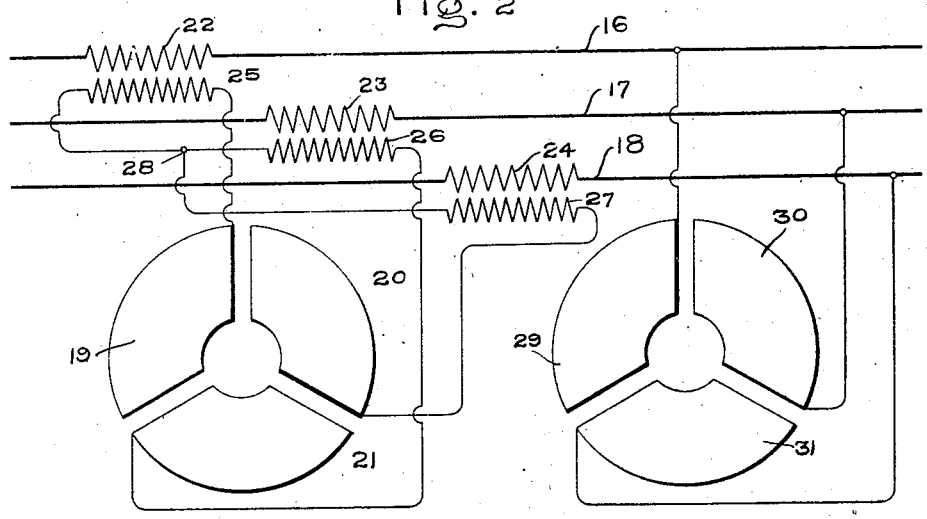

Figure 1 is a diagrammatic representation of one embodiment of my invention; Fig. 2, a diagrammatic representation of a modification, and Figs. 3 and 4 views of so much of the instrument itself as is necessary to an understanding of my invention.

The phase-measuring instrument or power-factor indicator as constructed in accordance with my invention consists of two relatively movable members, one of which may be fixed and the other rotatable. Each member is charged electrostatically, so as to be the seat of a rotating electrostatic field. Where the power factor of a multiphase alternating-current system is to be measured, this is readily accomplished by suitable connections between portions of the instrument and the system, while when the instrument is to be employed in connection with a single-phase alternating-current system some usual or well-known system of phase splitting or phase transformation may be utilized.

In Fig. 1, which represents one embodiment of my invention in diagram, the alternating-current system to which the power-factor indicator is to be applied is represented conventionally by the three-phase mains 1, 2, and 3. The two members of the instrument are represented separately in Fig. 1, one being located at the right-hand portion of the figure and consisting of three adjacent segments or sectors 4, 5, and 6, and the other at the left-hand portion of the figure and consisting in the present instance of six adjacently-located sectors 7 to 12, inclusive. In the instrument as actually constructed these two sets of segments are located over each other in parallel planes, as shown in Figs. 3 and 4, to which reference will hereinafter be made. One set of segments—as, for example, that comprising the sectors 4, 5, and 6—has its sectors connected, respectively, to the three-phase mains 1, 2, and 3, whereby the sectors are maintained at the potentials of these mains. The other set of sectors 7 to 12, inclusive, are arranged to be charged to potentials varying in magnitude and phase with the currents in the three-phase system. This result may be effected in a variety of ways, and in the present instance is secured by connecting in each of the mains a resistance or other device, across which a drop of potential will exist, varying in magnitude and phase with the current in the main, each of the resistances to have its terminals or at least two points therein connected to two of the sectors of the set. Thus the resistance 13 in the main 1 has its terminals connected to the sectors 11 12. The resistance 14 in the main 2 similarly has its terminals connected to the sectors 9 10, while the remaining resistance 15 in the main 3 has its terminals connected to the remaining pair of sectors 7 8.

Instead of employing an energy-consuming device, such as a resistance, in order to secure potentials varying in magnitude and phase with the variation of currents in the main I may make use of current-transformers, as indicated in Fig. 2, in which case each of the three-phase mains 16, 17, and 18 of the system has the primary of a current-transformer included in series therewith, the secondaries being connected in Y relation to each other, with their free terminals joined to three sectors 19, 20, and 21 instead of to the three pairs of sectors illustrated at the left-hand portion of Fig. 1 above referred to. The three primaries of the current-transformers are indicated, respectively, at 22, 23, and 24 and their corresponding secondaries at 25, 26, and 27. One terminal of each of these secondaries is connected to a common point, as at 28, while the three remaining terminals are connected to the three sectors 19, 20, and 21. These three sectors comprise one element of the indicating device, while three other sectors 29, 30, and 31, connected, respectively, to the three-phase mains, and thereby maintained at the potentials of these mains, constitute the other element of the instrument, these two elements being relatively movable to each other, as already described in connection with the modification shown in Fig. 1.

The instrument illustrated in diagram in Fig. 1 may take the form shown in Figs. 3 and 4, in which the movable element consists, briefly speaking, of a pivoted shaft 30', carrying three sectors insulated from each other and designated in the drawings as 4, 5, and 6 to correspond with the similarly-designated sectors in the diagrammatic representation of the instrument in Fig. 1. These three sectors are connected to the alternating-current system, so as to be maintained at the potentials of the mains of said system, and these connections may be made in any well-known manner—as, for example, through the instrumentality of flexible leads 32, 33, and 34. (Indicated perhaps best in Fig. 4, but shown also in Fig. 3.)

The fixed element of the instrument consists in the present instance of six segments arranged symmetrically with respect to each other and located beneath the sectors of the movable member of the instrument. These fixed sectors correspond with the set of sectors numbered 7 to 12 in Fig. 1 and in Fig. 3 are similarly designated. The six sectors may be mounted mechanically in any suitable manner and are insulated, respectively, from each other. As shown in the drawings, the sectors have their inner ends clamped to an insulating-ring 36; but it will readily be understood that any other suitable means of support may be employed.

The pairs of sectors of the fixed set may be connected to the alternating-current system in a manner shown in Fig. 1. If it is desired to employ the mode of connection shown in Fig. 2, then the number of fixed segments is reduced to three to correspond with the representation in Fig. 2, the connections to be made accordingly.

It will readily be understood that the member responsive to potentials corresponding to current may be movable and the member responsive to voltages of the alternating-current system fixed, or the reverse. In either case there will be produced in each of the members a rotating electrostatic field, so that if the two members were to be placed at random with respect to each other a torque would be exerted between the two members. The movable member being preferably free to rotate without restraint would then turn under the influence of this torque until it had assumed a position where the torque became zero. If under these conditions the currents of the alternating-current system should be in phase with the electromotive forces, this position of the movable element of the instrument would indicate unity power factor. In case the currents of the system were to shift in phase relatively to the electromotive forces the electrostatic field in the element of the power-factor indicator corresponding thereto would shift correspondingly, thereby disturbing the balance of the torques existing between the two elements of the instrument, and thereby causing the movable element to assume a new position of equilibrium corresponding to a new value of power factor. The varying values of power factor are thus indicated by the positions assumed by the movable member as an index, to which a pointer 37 or other device movable over a scale 38 may be employed, as will be readily understood.

What I claim as new, and desire to secure by Letters Patent of the United States, is—

1. In a phase-indicating instrument, the combination of two relatively movable members, and electrostatic means for causing a movement of one element relatively to the other in accordance with the shifting in phase of a current or currents of an alternating-current system.

2. In a phase-indicating instrument, the combination of two relatively movable members, means for charging portions of one member to potentials corresponding to the potentials of the mains in an alternating-current system, means for charging portions of the other element to potentials corresponding in phase to the currents in said system, and means for indicating the position of one element relatively to the other.

3. In an indicating instrument, the combination of two relatively movable members, means for developing in one member a rotating electrostatic field due to potentials corresponding to the potentials of the mains of an alternating-current system, means for developing in the other element a rotating electrostatic field due to potentials corresponding in phase to the currents in said system, and means for indicating the position of one element relatively to the other.

4. In a phase-indicating instrument, the combination of a fixed member, a movable member free to rotate or assume without restraint any position with respect to the fixed member, means for charging portions of one member to potentials corresponding to the potentials of the mains of an alternating-current system, means for charging the portions of the other element to potentials corresponding in phase to the currents in said system, and means for indicating the deflection of the movable member.

In witness whereof I have hereunto set my hand this 24th day of October, 1902.

OTTO HOLZ.

Witnesses:
BENJAMIN B. HULL,
HELEN ORFORD.